United States Patent
Nay et al.

(10) Patent No.: US 10,191,725 B2
(45) Date of Patent: Jan. 29, 2019

(54) REARRANGEABLE CODE OPTIMIZATION MODULES

(71) Applicant: Facebook, Inc., Menlo Park, CA (US)

(72) Inventors: Shane Roland Nay, San Jose, CA (US); Bertrand Allen Maher, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 65 days.

(21) Appl. No.: 14/970,007

(22) Filed: Dec. 15, 2015

(65) Prior Publication Data

US 2017/0168791 A1   Jun. 15, 2017

(51) Int. Cl.
   *G06F 8/41*   (2018.01)
(52) U.S. Cl.
   CPC ................ *G06F 8/47* (2013.01); *G06F 8/443* (2013.01)
(58) Field of Classification Search
   CPC ........................................ G06F 8/443–8/4443
   See application file for complete search history.

(56) References Cited

U.S. PATENT DOCUMENTS

| 7,000,227 | B1 * | 2/2006 | Henry | G06F 8/443 |
| | | | | 717/146 |
| 7,181,735 | B1 * | 2/2007 | Haraguchi | G06F 8/443 |
| | | | | 717/146 |
| 2008/0184209 | A1 * | 7/2008 | LaFrance-Linden | G06F 8/443 |
| | | | | 717/130 |
| 2009/0064117 | A1 * | 3/2009 | Bashkansky | G06F 8/443 |
| | | | | 717/154 |
| 2009/0094590 | A1 * | 4/2009 | Mendelson | G06F 8/443 |
| | | | | 717/156 |
| 2009/0320008 | A1 * | 12/2009 | Barsness | G06F 8/443 |
| | | | | 717/151 |
| 2015/0046912 | A1 * | 2/2015 | Vick | G06F 8/443 |
| | | | | 717/152 |

OTHER PUBLICATIONS

Patel, Jay, and Mahesh Panchal. "Code Optimization in Compilers using ANN." IJCSMC, vol. 3, Issue. 5, May 2014, p. 557-561. (Year: 2014).*

Dalal, Vishal, and C. P. Ravikumar. "Software power optimizations in an embedded system." VLSI Design, 2001. Fourteenth International Conference on. IEEE. (Year: 2001).*

* cited by examiner

*Primary Examiner* — Chameli Das
*Assistant Examiner* — Joanne G Macasiano
(74) *Attorney, Agent, or Firm* — FisherBroyles, LLP

(57) ABSTRACT

Disclosed are ways to flexibly arrange, rearrange, and execute optimization modules for program code in user-customizable sequences. In various embodiments, computer programmers can select an order of multiple standalone optimizers that each perform an optimization function on program code, forming a pipeline of a series of optimization modules. The pipeline can be modified by, for example, adding, removing, rearranging, repeating, and/or replacing optimization modules.

20 Claims, 5 Drawing Sheets

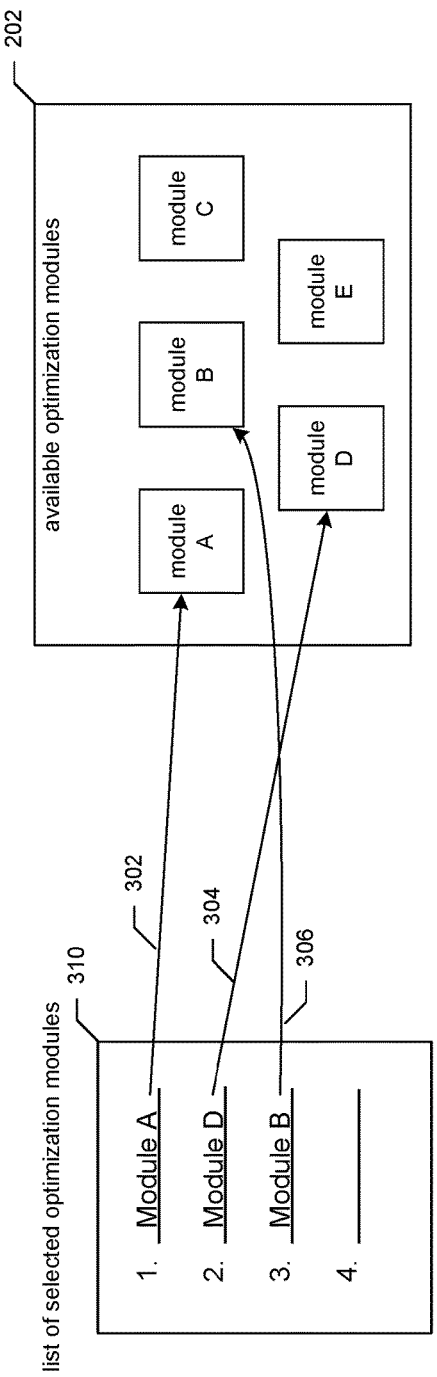

REARRANGEABLE CODE OPTIMIZATION MODULES

BACKGROUND

Computer programmers typically produce source code in high-level languages that humans can read and maintain. A compiler translates the source code so that the output is different than the input, typically by translating human-readable source code into machine-readable object code. A compiler may also translate source code into an intermediate representation ("IR"), such as Java® or Dalvik® bytecode, that may later be executed by a compatible runtime system (such as a virtual machine including an interpreter and/or a just-in-time ("JIT") compiler), or compiled to machine-specific object code.

Source code that is well structured for human comprehension is typically not optimally structured for computing performance. Optimizing compilers transform source code into lower level code that is functionally equivalent but can have improved performance when executed by a computer. For example, a compiler can be configured to increase the speed of the compiled code, reduce the size of the compiled code, and/or minimize the power consumed by a processor executing the compiled code.

BRIEF DESCRIPTION OF THE DRAWINGS

FIG. 3 is a schematic diagram illustrating an ordered list of a subset of code optimization modules in accordance with an embodiment.

FIG. 4 is a table diagram illustrating a table containing ordered optimization module sequence data in accordance with an embodiment.

DETAILED DESCRIPTION

Overview

The present disclosure describes code optimizer technology including systems and methods for performing code optimizations using "pluggable" optimization modules that can run pipelined optimizations in various orders. In various embodiments, in contrast to conventional compilers, modular optimizers can perform code optimizations on program code in various forms (e.g., source code, IR, or object code) independent of code translation. For example, an optimizer that is configured to rewrite Dalvik® executable ("Dex") bytecode for an Android™ device can take a file containing Dex bytecode (a "Dex file") or a group of Dex files as an input and produce Dex files (e.g., a different number of files) as an output. Different optimizers can perform different functions, such as a module configured to expand function calls inline (e.g., copying the body of a called function into the program in place of a function call), or a module configured to eliminate dead code. Multiple standalone optimizers can be arranged to execute in series. In some embodiments, optimizers may execute in parallel. Optimizers can be added to or removed from the optimization pipeline sequence, replaced, rearranged, and run multiple times, as desired. Thus, programmers can test the effects of optimization modules in the optimization pipeline individually and in various rearrangements. In various embodiments, modular optimizers can be flexibly used to optimize program code for various goals (e.g., to minimize bytecode size, execution speed, and/or memory usage).

Some embodiments can include program code infrastructure that can open one or more files (e.g., Dex files), generate an in-memory representation of the code in the opened files, and then after transformations applied by optimization modules, save the in-memory representation as one or more files (e.g., the same and/or other Dex files). For example, the applicant of the present disclosure has developed a "Redex" system for manipulating Dex files. Although many embodiments are described herein in the context of Dex files and code targeted for execution on Android™ devices, embodiments are not limited to Dex files or to code for Android™ devices. Various embodiments enable flexible optimization of code written in various computing languages, in various forms of program code (e.g., source code, IRs, and/or object code), for execution in various environments. Embodiments operating in some or all of the ways described above enable flexibly rearrangeable code optimization, improving the ability of programmers to easily implement targeted optimizations to improve the machine efficiency of maintainable source code.

Description of Figures

Figure 1:
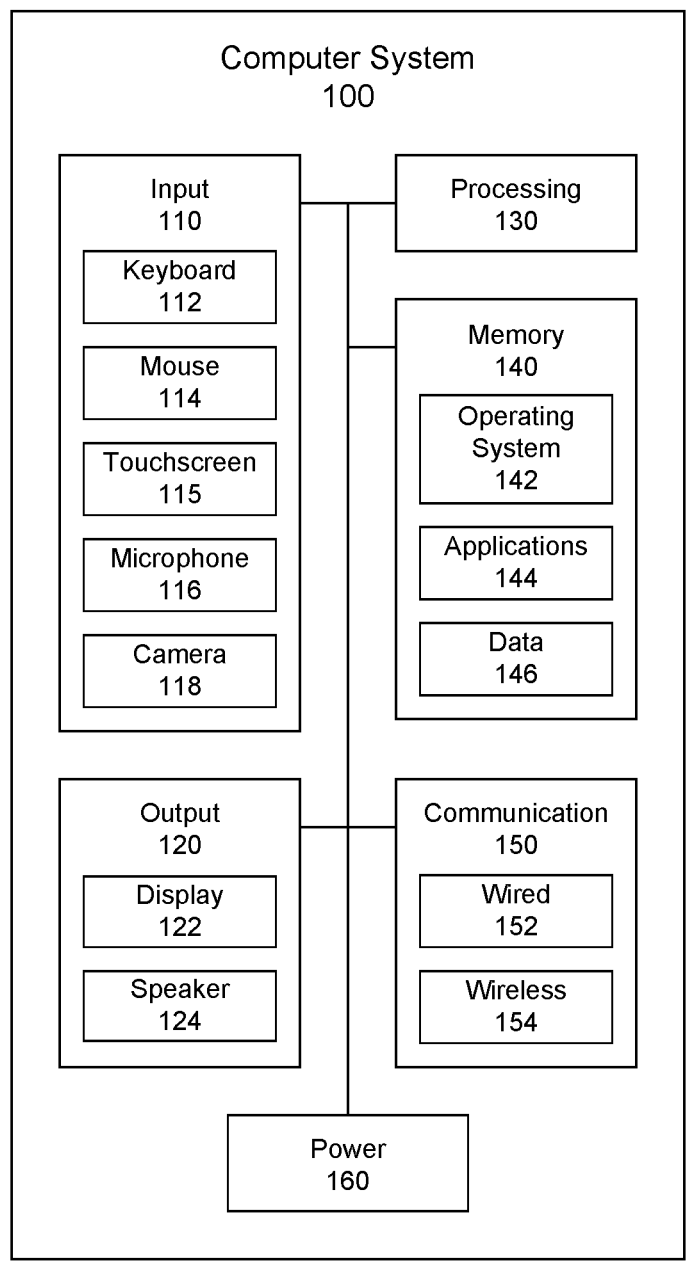
FIG. 1 is a block diagram showing some of the components typically incorporated in computer systems and other devices on which optimization modules can be executed.

FIG. 1 is a block diagram showing some of the components typically incorporated in computing systems and other devices on which optimization modules can be implemented. In the illustrated embodiment, the computer system 100 includes a processing component 130 that controls operation of the computer system 100 in accordance with computer-readable instructions stored in memory 140. The processing component 130 may be any logic processing unit, such as one or more central processing units (CPUs), graphics processing units (GPUs), digital signal processors (DSPs), field-programmable gate arrays (FPGAs), application-specific integrated circuits (ASICs), etc. The processing component 130 may be a single processing unit or multiple processing units in an electronic device or distributed across multiple devices. Aspects can be embodied in a special purpose computing device or data processor that is specifically programmed, configured, or constructed to perform one or more of the computer-executable instructions explained in detail herein. Aspects can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices.

The processing component 130 is connected to memory 140, which can include a combination of temporary and/or permanent storage, and both read-only memory (ROM) and writable memory (e.g., random access memory or RAM, CPU registers, and on-chip cache memories), writable non-volatile memory such as flash memory or other solid-state memory, hard drives, removable media, magnetically or optically readable discs and/or tapes, nanotechnology memory, synthetic biological memory, and so forth. A memory is not a propagating signal divorced from underlying hardware; thus, a memory and a computer-readable storage medium do not refer to a transitory propagating signal per se. The memory 140 includes data storage that contains programs, software, and information, such as an operating system 142, application programs 144, and data 146. Computer system 100 operating systems 142 can include, for example, Windows®, Linux®, Android™, iOS®, and/or an embedded real-time operating system. The application programs 144 and data 146 can include software and databases—including data structures, database records, other data tables, etc.—configured to control computer system 100 components, process information (to, e.g., optimize program code data), communicate and exchange data and information with remote computers and other devices, etc.

The computer system 100 can include input components 110 that receive input from user interactions and provide input to the processor 130, typically mediated by a hardware controller that interprets the raw signals received from the input device and communicates the information to the processor 130 using a known communication protocol. Examples of an input component 110 include a keyboard 112 (with physical or virtual keys), a pointing device (such as a mouse 114, joystick, dial, or eye tracking device), a touchscreen 115 that detects contact events when it is touched by a user, a microphone 116 that receives audio input, and a camera 118 for still photograph and/or video capture. The computer system 100 can also include various other input components 110 such as GPS or other location determination sensors, motion sensors, wearable input devices with accelerometers (e.g. wearable glove-type or head-mounted input devices), biometric sensors (e.g., a fingerprint sensor), light sensors (e.g., an infrared sensor), card readers (e.g., a magnetic stripe reader or a memory card reader), and so on.

The processor 130 can also be connected to one or more various output components 120, e.g., directly or via a hardware controller. The output devices can include a display 122 on which text and graphics are displayed. The display 122 can be, for example, an LCD, LED, or OLED display screen (such as a desktop computer screen, handheld device screen, or television screen), an e-ink display, a projected display (such as a heads-up display device), and/or a display integrated with a touchscreen 115 that serves as an input device as well as an output device that provides graphical and textual visual feedback to the user. The output devices can also include a speaker 124 for playing audio signals, haptic feedback devices for tactile output such as vibration, etc. In some implementations, the speaker 124 and the microphone 116 are implemented by a combined audio input-output device.

In the illustrated embodiment, the computer system 100 further includes one or more communication components 150. The communication components can include, for example, a wired network connection 152 (e.g., one or more of an Ethernet port, cable modem, FireWire cable, Lightning connector, universal serial bus (USB) port, etc.) and/or a wireless transceiver 154 (e.g., one or more of a Wi-Fi transceiver; Bluetooth transceiver; near-field communication (NFC) device; wireless modem or cellular radio utilizing GSM, CDMA, 3G and/or 4G technologies; etc.). The communication components 150 are suitable for communication between the computer system 100 and other local and/or remote computing devices, directly via a wired or wireless peer-to-peer connection and/or indirectly via a communication link and networking hardware, such as switches, routers, repeaters, electrical cables and optical fibers, light emitters and receivers, radio transmitters and receivers, and the like (which can include the Internet, a public or private intranet, a local or extended Wi-Fi network, cell towers, the plain old telephone system (POTS), etc.). The computer system 100 further includes power 260, which can include battery power and/or facility power for operation of the various electrical components associated with the computer system 100.

Examples of well-known computing systems, environments, and/or configurations that may be suitable for use with embodiments include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like. While computer systems configured as described above are typically used to support the operation of optimization modules, one of ordinary skill in the art will appreciate that embodiments may be implemented using devices of various types and configurations, and having various components.

Figure 2:
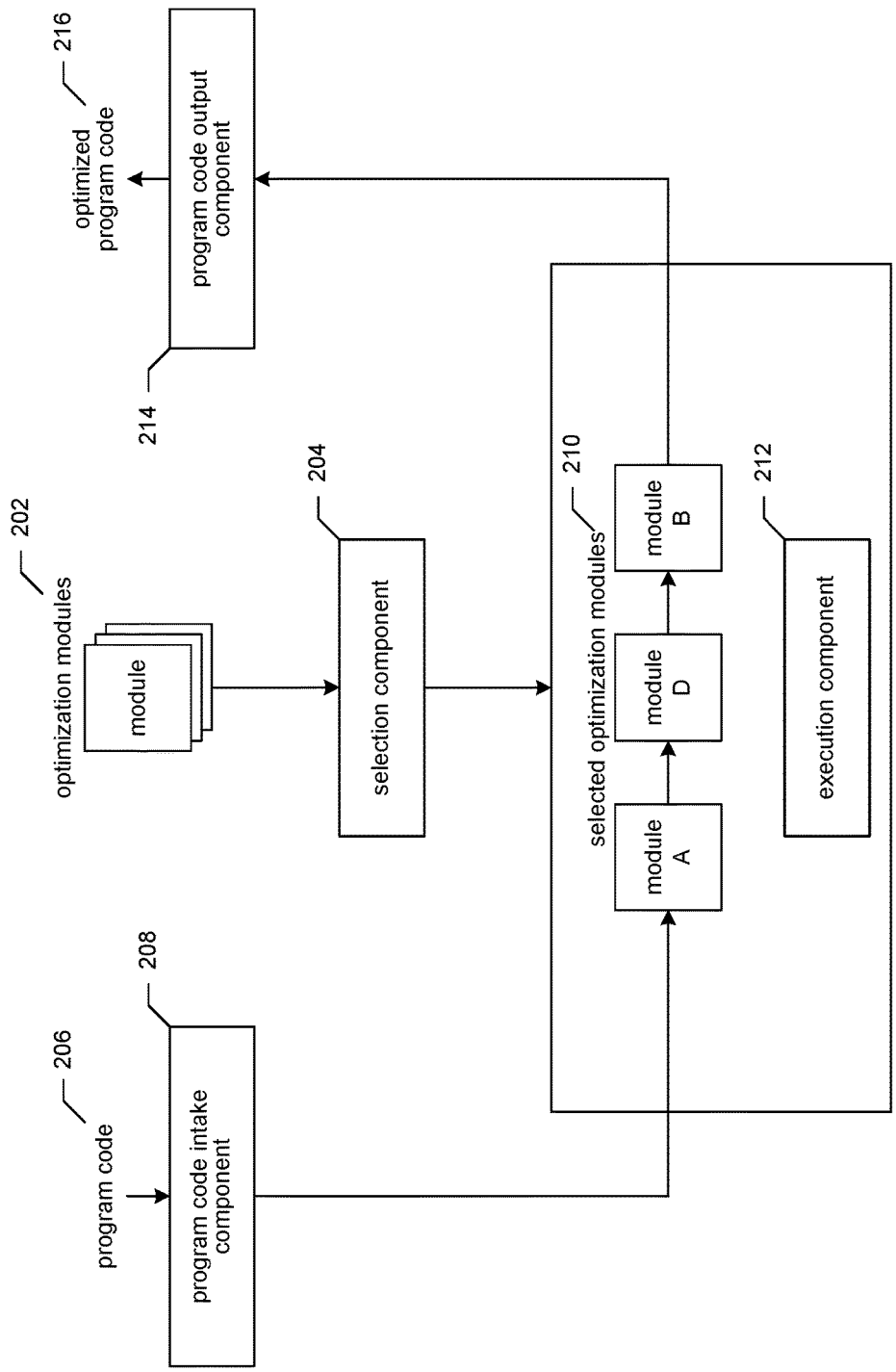
FIG. 2 is a data flow diagram illustrating logical relationships among code optimization components in accordance with an embodiment.

FIG. 2 is a data flow diagram illustrating logical relationships among code optimization components in accordance with an embodiment. In various embodiments, a computing system such as the computer system 100 of FIG. 1 and/or one or more other processing devices operably connectable to the computer system, such as a remote computing server, can implement the code optimization components and the data flows depicted in FIG. 2. In the illustrated embodiment, program code 206 is provided to a program code intake component 208. In various embodiments, the program code 206 can include high-level programming language source code, IR bytecode, or machine-readable binary object code. For example, the program code intake component 208 can load code from a group of files (e.g., a set of Java® or Android™ .java or .class files, and/or IR code such as Java® or Android™ bytecode derived from such files), and generate an in-memory representation of the program to be optimized.

A selection component 204 selects (e.g., in response to user input) optimization modules 210 from a set of optimization modules 202, so that the selected optimization modules 210 will be applied to the program code 206 in a selected order. In some embodiments, the selection component 204 provides a user interface that enables a user to add an optimization module 202 to the list of selected optimization modules 210, remove an optimization module 202 from the list of selected optimization modules 210, and/or rearrange optimization modules 202 in the list of selected optimization modules 210. For example, the selection component 204 can include a text command line interface implementing commands and/or command line options to select, deselect, and/or change the order of selected optimization modules 210 (e.g., a command including a sequential list of option flags that represent optimization modules to apply, or one or more commands indicating a sequence of executable optimization modules to run). As another example, the selection component 204 can include a graphical interface that represents each optimization module 202 as, e.g., a stand-alone optimization "plugin" that snaps into place behind the previous plugin in a visual arrangement of selected optimization modules 210.

Each optimization module can be configured to apply a particular transformation. For example, an optimization module can be configured to "minify" strings, e.g., reducing the number of bytes in the code by replacing human-readable strings such as a function named "MyFooSuccess-Callback( )" with a placeholder string such as "abc( )" In some embodiments, such a string minification module can also store the original string names in a back-map file that is referenced in debugging but not included in shipped code, allowing code size to be reduced without loss of information for software engineers.

In some embodiments, the code optimization components of FIG. 2 are configured to optimize IR code for Android™ computing devices. For example, the program code intake component 208 can be configured to receive one or more Dex files (e.g., before the Dex files are packaged into an Android™ application package ("APK")). Similarly, optimization modules 202 can be configured to perform optimizations specific to Android™ IR code, such as interclass optimizations on code across multiple classes and/or multiple Dex files (including, e.g., global program-level transformations that require various source code files to be compiled into Dex bytecode), rather than just local class-level optimizations.

The program code intake component 208 receives the program code 206 and passes it to an execution component 212. The execution component 212 applies each of the selected optimization modules 210 to the program code 206. In various embodiments, the execution component 212 functions as an optimization pipeline having a configurable series of stages. Each selected optimization module 210 operates as a stage in the pipeline. In the illustrated example, the execution component 212 applies the transformations of module A, module D, and module B to the program code 206, in that order. The program code 206 enters at the beginning of the pipeline, is transformed by each selected optimization module 210 in turn, and is output as optimized program code 216 by a program code output component 214 at the end of the pipeline. For example, a software engineer can configure the program code output component 214 to save the optimized program code 216 to one or more files, pass the optimized program code 216 to another program, transmit the optimized program code 216 to another computing system, and so on. The optimized program code 216 can be saved, reviewed, analyzed, displayed, compiled, executed, etc.

Various embodiments enable a user to chain multiple different, potentially unrelated code transformation optimization modules 210 behind one another for execution by the execution component 212. In various embodiments, the user can execute a selected optimization module 210 more than once in a pipeline. Some embodiments enable users to experiment with different selected optimization modules 210 and different orderings of selected optimization modules 210 to identify a more effective arrangement of selected optimization modules 210 for a particular optimization goal. In some embodiments, a user can perform a first set of optimizations to program code, store the partly optimized result, and then apply one or more additional optimizations in various versions and combinations to the stored program code, so that the user does not have to repeatedly apply the first set of optimizations when experimenting with additional optimizations. Various embodiments enable the user to save the chosen order of the selected optimization modules 210, commit the order of selected optimization modules 210 from a test system to a production server, publish an arrangement of selected optimization modules 210 for other users, etc.

FIG. 3 is a schematic diagram illustrating an ordered list of a subset of code optimization modules in accordance with an embodiment. In the illustrated embodiment, an ordered list 310 identifies each of the selected optimization modules 210 of FIG. 2, in the order in which the selected optimization modules 210 will be executed or applied to program code 206. Each numbered item in the ordered list 310 names one of the available optimization modules 202; pointers 302, 304, and 306 relate the items in the ordered list 310 to the unordered set of available optimization modules 202. An empty fourth entry in the ordered list 310 indicates that a user may add an optimization module 202 to the ordered list 310 of selected optimization modules 210.

FIG. 4 is a table diagram illustrating a table containing ordered optimization module sequence data in accordance with an embodiment. The optimization module sequence table 400 is made up of rows 401-403, each representing an optimization module in a selected ordering of optimization modules, e.g., for execution in sequence. Each row is divided into the following columns: an Order column 411 containing an ordinal number for the optimization module (e.g., an indication of its position in the sequence); a Module Name column 412 containing an identifier of the optimization module, such as a name meaningful to a human programmer; and a Module Address column 413 containing an address of the optimization module, e.g., a file system location. For example, row 401 indicates that optimization module number 1, labeled "String Minification," is located at the address/optimize/modules/minification. In some embodiments, the optimization module sequence table 400 is indexed on the Order column 411 or the Module Name column 412, such that this index (e.g., plus the set of available optimization modules 202) can be used to look up the next optimization module to be executed (e.g., by the execution component 212 of FIG. 2). In some embodiments, the optimization module sequence table 400 is indexed on the Address column 413, such that this index plus the set of available optimization modules 202 can be used to look up the names of the selected optimization modules 210. In some embodiments, the optimization module sequence table 400 can include other information; for example, data about additional or different optimization module attributes, and/or sequence data such as references to each different ordering in which an available optimization module 202 is included.

Although the contents and organization of the optimization module sequence table 400 are designed to make them more comprehensible by a human reader, those skilled in the art will appreciate that actual data structures used to store this information can differ from the table shown. For example, they can be organized in a different manner (e.g., in multiple different data structures, of various types (e.g., linked lists, arrays, queues, hash tables, and so on)); can contain more or less information than shown; can be compressed and/or encrypted; etc.

Figure 5:
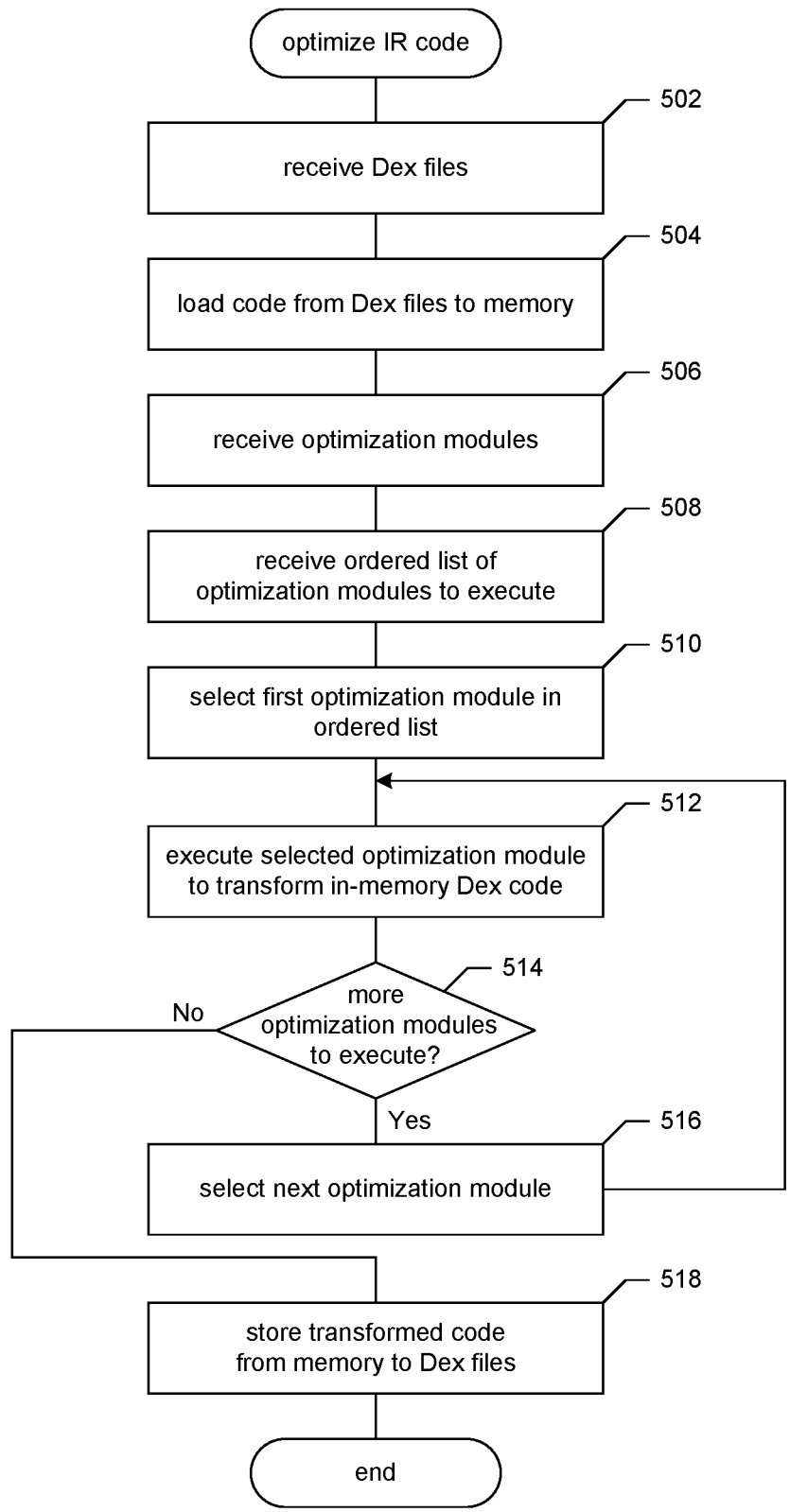
FIG. 5 is a flow diagram illustrating a process for a computer system to optimize IR code in accordance with an embodiment.

FIG. 5 is a flow diagram illustrating a process for a computer system to optimize IR code in accordance with an embodiment. Optimizing code using conventional techniques typically involves directing an optimizing compiler to perform various preset optimizations when converting code from one form to another (e.g., from source to object code). If choices regarding the optimizations are available, they typically involve selecting one of a few predetermined optimization "levels" that offer trade-offs between more or less aggressive optimization and longer or shorter compilation times. Embodiments as described herein, on the other hand, support flexible user customization of optimization via configurable orderings of individual selectable optimization modules that can be executed independent of compilation.

In block 502, the computer system receives one or more Dex files containing IR code. In block 504, the computer system (e.g., program code manipulation infrastructure, such as the program code intake component 208 of FIG. 2) loads the IR code (or, e.g., a portion of the IR code) from the Dex files into memory. In block 506, the computer system receives a set of optimization modules, e.g. pointers to the available optimization modules 202 of FIG. 2. In block 508, the computer system (e.g., the selection component 204 of FIG. 2) receives an ordered list of optimization modules to execute on the loaded code, such as the ordered list 310 of FIG. 3 or the optimization module sequence table 400 of FIG. 4.

In block 510, the computer system (e.g., the execution component 212 of FIG. 2) selects the first optimization module in the ordered list, e.g., in response to user input to apply the listed optimization modules to the received code. In block 512, the computer system executes the selected optimization module to transform the in-memory code loaded from the Dex file in block 504. In some embodiments, optimization modules are executable, and the computer system executes the module. In some embodiments, optimization modules are not themselves executable, but, for example, configure the operation of a code modification system such as the execution component 212 of FIG. 2.

In decision block 514, the computer system determines whether, after execution of the selected optimization module, any more optimization modules remain in the ordered list of optimization modules to execute. If there is at least one additional optimization module in the ordered list of optimization modules to execute, then in block 516 the computer system selects the next optimization module in the ordered list, and proceeds to block 512 as described above. If, however, there are no more optimization modules to execute, then the process proceeds to block 518. In block 518, the computer system (e.g., the program code output component 214 of FIG. 2) stores the transformed IR code from its in-memory representation to one or more Dex files. In some embodiments, the computer system stores the transformed code into a different number of Dex files than the Dex files received in block 502. For example, the system can store related code from multiple files in a single file (e.g., so that all resources that are needed when a program is launched are stored in the same file), or split code from one file into multiple files (e.g., so that the amount of code loaded from a single file is reduced).

Figure 6:
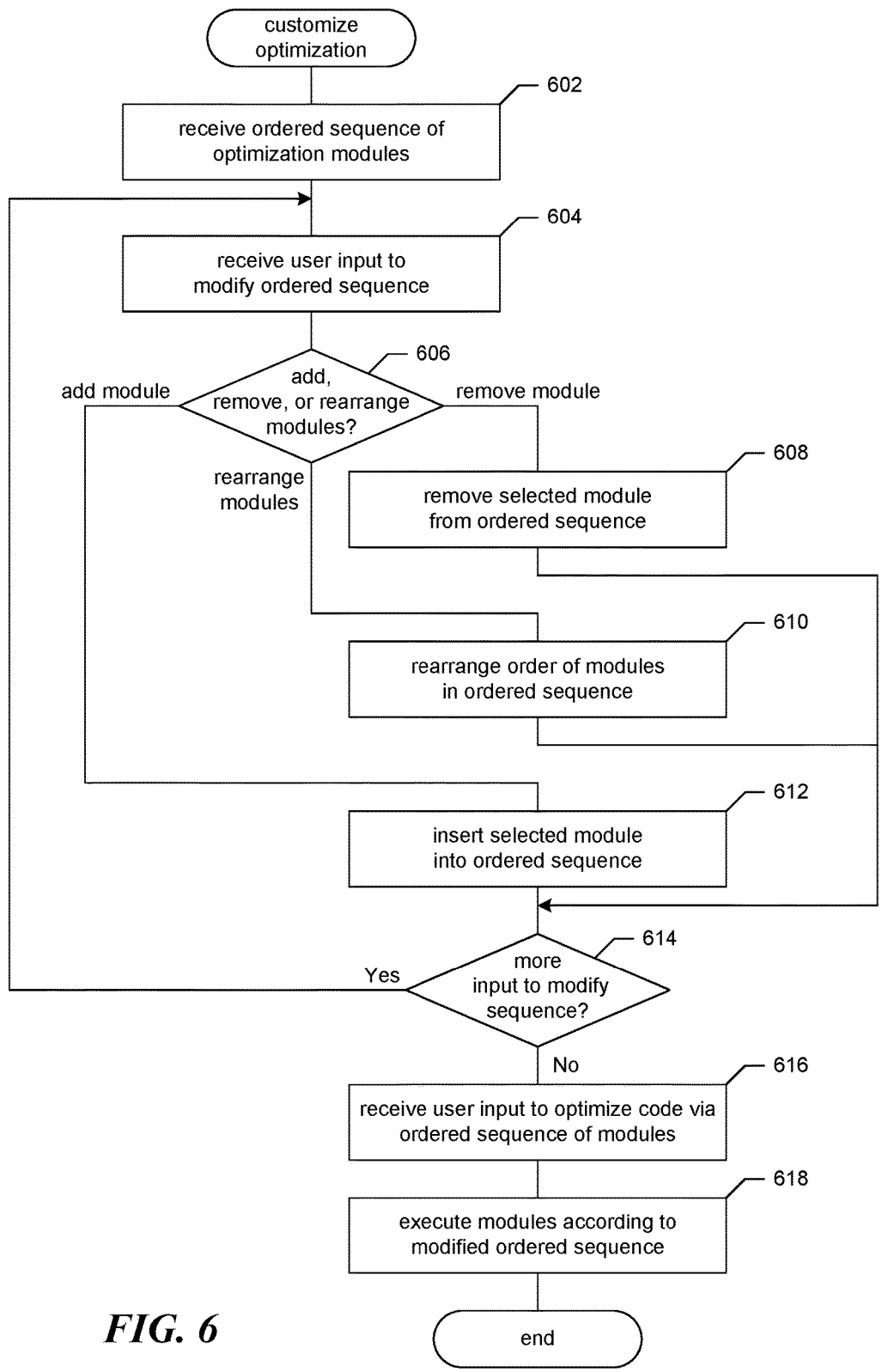
FIG. 6 is a flow diagram illustrating a process to customize an optimization module pipeline in accordance with an embodiment.

FIG. 6 is a flow diagram illustrating a process to customize an optimization module pipeline in accordance with an embodiment. In block 602, a computer system receives an ordered sequence of optimization modules, e.g., a user-provided data structure such as a table containing a list or queue of selected optimization modules. In block 604, the computer system receives user input to modify the ordered sequence.

In decision block 606, the computer system determines whether the user input to modify the ordered sequence of optimization modules is a command to remove a selected module from the ordered sequence, rearrange the order of modules in the ordered sequence, or add a module to the ordered sequence. If the user input is a command to remove a selected module from the ordered sequence, then in block 608, the computer system updates the ordered sequence of optimization modules by removing the selected module, such that the optimization pipeline sequence is shortened. If the user input is a command to rearrange the order of modules in the ordered sequence, then in block 610, the computer system updates the ordered sequence of optimization modules by reordering the selected modules, such that the optimization pipeline sequence is the same length but applies the optimization modules in a different sequence. If the user input is a command to add a module to the ordered sequence, then in block 612, the computer system updates the ordered sequence of optimization modules by inserting the selected module at the selected point in the sequence, such that the optimization pipeline sequence is lengthened. After block 608, 610, or 612, the process proceeds to block 614.

In decision block 614, the computer system determines whether the user continues to provide input to further modify the ordered sequence of optimization modules. If the user provides more input to modify the sequence, then the computer system proceeds to block 604 as described above. If, on the other hand, the user is done modifying the ordered sequence of optimization modules, then the process proceeds to block 616. In block 616, the computer system receives user input to optimize program code using the modified ordered sequence of optimization modules. In block 618, the computer system executes or applies each of the optimization modules in turn, according to the modified ordered sequence.

Embodiments operating in some or all of the ways described above provide a flexible infrastructure for users to customize code optimization for various overall goals (e.g., to reduce the size and/or increase the speed of optimized code). Different users can explore opportunities for performance and/or efficiency improvements by sequencing and rearranging optimization modules in different ways. Users can apply sequences of optimization modules to optimize code without tying optimization to compilation. Software engineers can improve and replace optimization modules and flexibly substitute modules to improve optimization processes with minimal friction.

CONCLUSION

From the foregoing, it will be appreciated that specific embodiments of the disclosure have been described herein for purposes of illustration, but that various modifications may be made without deviating from the spirit and scope of the various embodiments of the disclosure. As used herein, program code includes source code, IR code, and/or object code, and executable instructions includes IR code and/or object code. One skilled in the art would understand that when one of these terms is used, the others could be used as well. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited except as by the appended claims.

We claim:

1. A system for optimizing executable instructions, comprising:
a set of two or more optimization modules,
wherein each optimization module in the set is configured to:
receive unoptimized executable instructions;
transform the unoptimized executable instructions into optimized executable instructions of a same type of the unoptimized executable instructions by performing, on the unoptimized executable instructions, optimizations specific to the type of the unoptimized executable instructions; and output the optimized executable instructions;

a selection component configured to:
receive user input selecting an order and an arrangement for executing two or more optimization modules from the set; and
create an optimization pipeline from the user input, the optimization pipeline configured to, when executed:
receive input executable instructions; and
output a result of applying, in the selected order, each of the two or more optimization modules from the set to the input executable instructions according to the arrangement;

an executable instructions intake component configured to receive one or more first files storing the executable instructions;

an execution component configured to:
receive additional user input selecting the optimization pipeline to be applied to the executable instructions; and
execute, with the executable instructions as input, the optimization pipeline; and an executable instructions output component configured to store the output of the optimization pipeline in one or more second files.

2. The system of claim 1 wherein the one or more first files and the one or more second files store intermediate representation bytecode.

3. The system of claim 1 wherein the user input selecting the order and the arrangement for executing the two or more optimization modules comprises an ordered list of optimization modules.

4. The system of claim 1 wherein the user input selecting the order and the arrangement for executing the two or more optimization modules comprises a selection of a first optimization module and a second optimization module followed by a selection of a series arrangement of the first optimization module and the second optimization module, the series arrangement causing the output of the first optimization module to be the input of the second optimization module.

5. The system of claim 1 wherein the user input selecting the order and the arrangement for executing the two or more optimization modules comprises a modification of a first optimization module to take as input the output of a second optimization module.

6. The system of claim 1 wherein the selection component is configured to receive user input selecting a permutation of a proper subset of the set, such that fewer than all of the optimization modules in the set are in the arrangement.

7. The system of claim 1 wherein the arrangement for executing the two or more optimization modules includes a particular optimization module multiple times.

8. The system of claim 1:
wherein the executable instructions intake component is configured to load the executable instructions from the one or more first files into an in-memory representation of the executable instructions;
wherein each optimization module in the optimization pipeline is configured to transform the executable instructions in the in-memory representation; and
wherein the executable instructions output component is configured to store the executable instructions from the in-memory representation into the one or more second files.

9. The system of claim 1 wherein the execution component is configured to transform the executable instructions without compiling the executable instructions from high-level instructions to lower-level instructions.

10. The system of claim 1 wherein the user input selecting the order and the arrangement for executing the two or more optimization modules comprises a selection of a parallel arrangement of at least two of the two or more optimization modules.

11. A method performed by a computing system having memory and a processor for optimizing executable instructions, comprising:
receiving a set of multiple optimization modules, wherein each optimization module in the set is configured to:
receive unoptimized executable instructions;
transform the unoptimized executable instructions into optimized executable instructions of a same type of the unoptimized executable instructions by performing, on the unoptimized executable instructions, optimizations specific to the type of the unoptimized executable instructions; and
output the optimized executable instructions;
receiving user input selecting an order and an arrangement for executing two or more optimization modules from the set;
creating an optimization pipeline from the user input, the optimization pipeline configured to, when executed:
receive input executable instructions; and
output a result of applying, in the order, each of the two or more optimization modules to the input executable instructions according to the arrangement;
receiving, after creating the optimization pipeline, one or more first files containing the executable instructions;
loading the executable instructions from the one or more first files to generate a representation of the executable instructions in the memory;
for each optimization module in the optimization pipeline, in the order,
applying, by the processor, the optimization module to the representation of the executable instructions in the memory according to the arrangement; and
storing the transformed representation of the executable instructions in the memory into one or more second files.

12. The method of claim 11 wherein the one or more first files and the one or more second files store intermediate representation bytecode.

13. The method of claim 11 wherein the number of optimization modules in the optimization pipeline is greater than the number of optimization modules in the set of optimization modules.

14. The method of claim 11 wherein the number of optimization modules in the optimization pipeline is less than the number of optimization modules in the set of optimization modules.

15. The method of claim 11, further comprising receiving a modified order or arrangement designating different optimization modules.

16. The method of claim 11, further comprising receiving a modified order or arrangement designating a different order of optimization modules.

17. The method of claim 11 wherein the optimization modules in the optimization pipeline are executable, such that applying the optimization module to the representation in the memory comprises executing the optimization module.

18. A computer-readable storage medium storing computer-executable instructions for causing a computing system having a processor to optimize intermediate representation executable instructions without compilation, the instructions comprising:

instructions for receiving user input comprising a selection of an optimization module;

instructions for modifying, in response to the selection, an order and an arrangement of optimization modules in an optimization pipeline;

wherein each optimization module in the optimization pipeline is configured to cause a transformation of the intermediate representation executable instructions, and wherein each optimization module in the optimization pipeline is configured to perform optimizations specific to a type of the executable instructions;

instructions for receiving user input to use the optimization pipeline to optimize the intermediate representation executable instructions; and instructions for causing, by the processor, in response to the user input to use the optimization pipeline, execution of the optimization modules in the optimization pipeline to optimize the intermediate representation executable instructions, wherein the execution of the optimization modules in the optimization pipeline is according to the order and the arrangement of optimization modules, and wherein at least one optimization module transforms, based on the order and the arrangement of optimization modules, optimized intermediate representation executable instructions transformed by a previous optimization module.

19. The computer-readable storage medium of claim 18, further comprising causing a list of optimization modules to be displayed on a display screen.

20. The computer-readable storage medium of claim 18 wherein the instructions for receiving user input comprising a selection of an optimization module include instructions for receiving user input comprising adding an optimization module, removing an optimization module, or rearranging optimization modules in the optimization pipeline.

* * * * *